(12) United States Patent
Fasen (10) Patent No.: US 8,665,552 B2
(45) Date of Patent: Mar. 4, 2014

(54) CONTROLLING POSITIONS OF STORAGE MEDIA HEADS

(75) Inventor: Donald J. Fasen, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 659 days.

(21) Appl. No.: 12/834,674

(22) Filed: Jul. 12, 2010

(65) Prior Publication Data

US 2012/0008232 A1    Jan. 12, 2012

(51) Int. Cl.
*G11B 5/584*      (2006.01)
*G11B 5/58*      (2006.01)

(52) U.S. Cl.
USPC .................................. 360/77.12; 360/77.01

(58) Field of Classification Search
None
See application file for complete search history.

(56) References Cited

U.S. PATENT DOCUMENTS

| | | | |
|---|---|---|---|
| 4,691,152 A * | 9/1987 | Ell et al. .................. | 318/616 |
| 5,978,752 A | 11/1999 | Morris | |
| 6,462,904 B1 | 10/2002 | Albrecht et al. | |
| 6,600,616 B2 | 7/2003 | McAllister et al. | |
| 6,690,534 B2 | 2/2004 | Ding et al. | |
| 6,898,039 B2 | 5/2005 | Kobayashi et al. | |
| 7,110,212 B2 | 9/2006 | Bui et al. | |
| 7,268,970 B2 | 9/2007 | Anderson et al. | |
| 7,333,291 B1 | 2/2008 | Fasen | |
| 7,684,144 B1 | 3/2010 | Goker et al. | |
| 7,697,230 B2 | 4/2010 | Fasen | |
| 2009/0219646 A1 | 9/2009 | Ishihara et al. | |
| 2009/0252009 A1 * | 10/2009 | Kubota et al. ............ | 369/53.3 |
| 2010/0079905 A1 | 4/2010 | Fasen | |

* cited by examiner

*Primary Examiner* — Andrew L Sniezek (57) ABSTRACT

Controlling positions of storage media heads is disclosed. An example storage media head position controller includes a position error filter to filter a media head position error based on a target position for a storage media head relative to a storage medium and a present media head position to generate a position signal, and a media speed monitor to modify an integration factor in the position error filter based on a media speed to adjust a phase margin of the position control loop.

23 Claims, 8 Drawing Sheets

CONTROLLING POSITIONS OF STORAGE MEDIA HEADS

BACKGROUND

Storage media drives, such as tape drives, hard disk drives, and removable media drives translate and/or rotate a storage medium while a read and/or write head interacts with the storage medium. For example, a magnetic head in a hard disk drive reads and/or writes information to magnetic plates while the magnetic disk rotates adjacent the head. Similarly, a storage tape head reads and/or writes data to one or more tracks along a storage tape while the tape travels adjacent the head. The movement of storage media may cause noise and interference with the placement of a read/write head relative to a storage medium.

Certain examples are shown in the above-identified figures and described in detail below. Several examples are described throughout this specification. The figures are not necessarily to scale and certain features and certain views of the figures may be shown exaggerated in scale or in schematic for clarity and/or conciseness. Although the following discloses example methods, apparatus, and articles of manufacture, it should be noted that such methods and apparatus are merely illustrative and should not be considered as limiting the scope of this disclosure.

DETAILED DESCRIPTION

Data storage devices, such as tape drives, hard drives, optical drives, and/or the like, may be connected to computers and/or other devices for storage and/or reading of data. Physical data storage devices may have moving parts, such as actuators, that move a particular storage medium and/or a data read/write head. Due to the compact nature of data storage, relatively slight physical vibration or noise may cause unwanted position changes in the storage medium and/or the read/write head, thereby resulting in errors in the placement of data bits on the physical storage medium. To reduce and/or avoid errors due to vibration or other sources of undesirable physical position changes, example storage media head controllers constructed in accordance with the teachings of this disclosure include a closed control loop that feeds back a storage media head position for comparison to a target position. A difference detected by this comparison is used to correct the position of the read/write head and, thus, reduce or avoid data errors that would have been caused by vibration or the like.

To further reduce the occurrence of data errors due to vibrations or the like, example storage media head controllers constructed in accordance with the teachings of this disclosure further include a position error filter to compensate the control loop for errors in a storage media head position and adjust one or more characteristics of the position error filter to filter noise from the closed control loop signals representing the read/write head position. These example position error filters include an integrator having an integration factor that is selected to improve the rejection of position error noise. In some examples, the integration factor is selected to reduce low frequency position error noise (e.g., 200-1000 Hz).

As described in more detail below, storage media may have different operating speeds (e.g., the speed of movement of the storage media may be different for different environments of use) to accommodate computers or devices having different processing and/or communication performances. In some examples, the position error filter further includes a media speed monitor that monitors the speed of the storage medium and modifies the integration factor of the integrator based on the monitored speed. By modifying the integration factor, these example storage media head controllers decrease closed loop noise amplification, increase closed loop noise rejection in selected frequency ranges, and/or increase control loop stability, thereby reducing, avoiding, and/or eliminating the instabilities found in known storage media position controllers employing filtered control loops and, thus, reducing and/or eliminating data errors.

Although the following focuses on tape storage devices, the teaching of this disclosure may be applied to other types of storage devices such as optical storage devices, and/or non-tape based magnetic storage media such as hard disk drives, etc.

Figure 1:
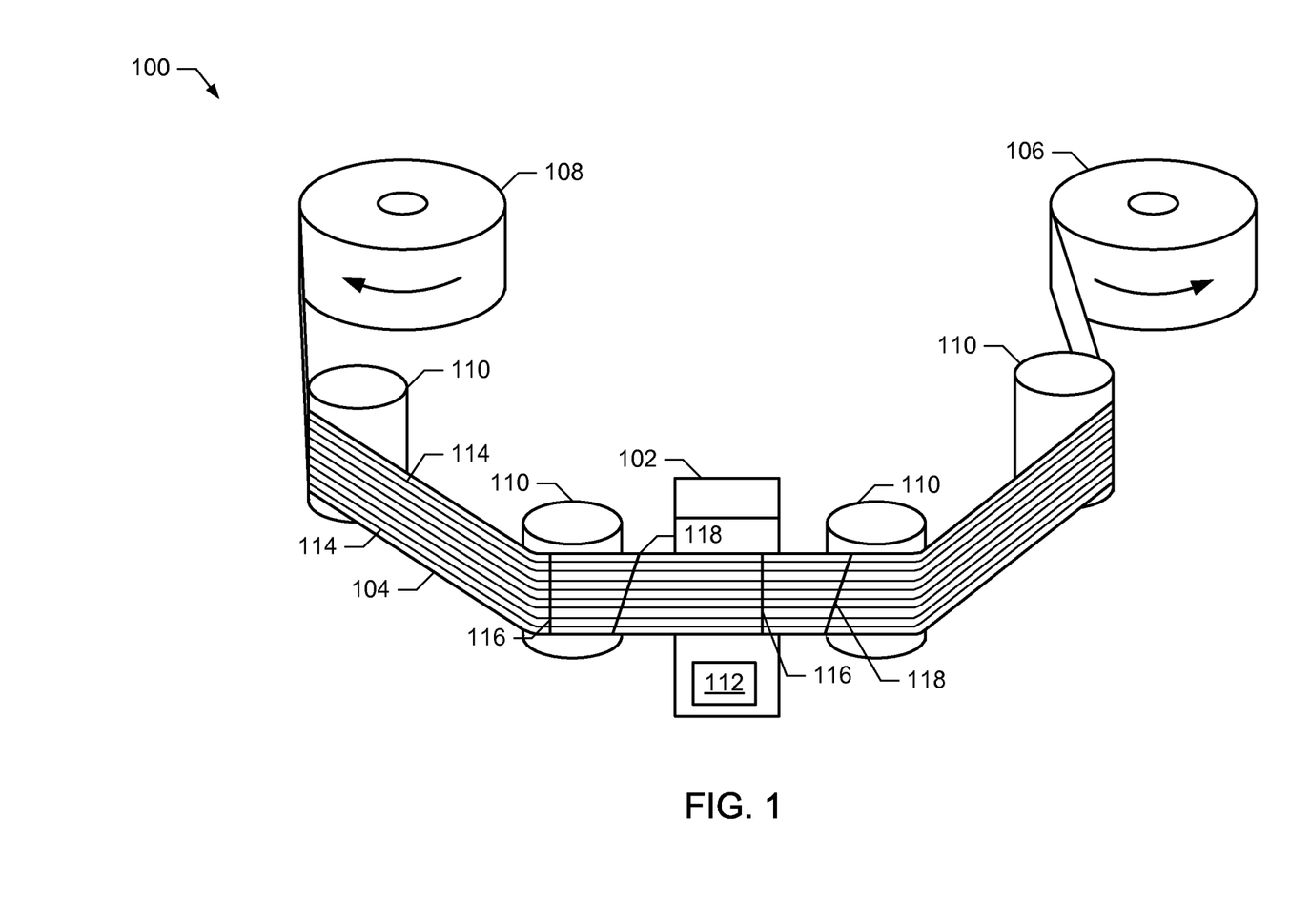
FIG. 1 illustrates an example tape storage medium including a storage media head in accordance with the teachings described herein.

FIG. 1 illustrates a tape storage device 100 including a storage media head 102. The example tape storage device 100 includes a magnetic tape 104 that is transferred between a source reel 106 and a takeup reel 108. The takeup reel 108 turns to receive the tape 104, which winds around several rollers 110. The rollers 110 direct the tape 104 past the storage media (e.g., read/write) head 102, which reads and/or writes data to tracks that run longitudinally along the tape 104. In some examples, the tape 104 complies with the linear tape open (LTO) standard.

The storage media head 102 of the illustrated example includes a tape head position controller 112 which moves the read/write head to align with the track(s) to which the storage media head 102 is presently reading and/or writing data. In other examples, the tape head position tracking controller is replaced by, for example, an optical head position tracking controller for optical media and/or a magnetic head position tracking controller for other types of magnetic media (e.g., non-tape based media).

The storage media head 102 reads and/or writes data from and/or to the storage medium (e.g., the tape 104). In some examples, the tape storage device 100 is a peripheral or internal data storage device to a processing platform (e.g., a computer). Processing platforms may vary widely in performance and communication speeds. For example, a computer having less processing or communication performance may communicate data to the data storage device at a lower rate than a computer having a higher performance. In some examples, the speed at which the tape 104 moves (or rotates) may be changed to match a performance (e.g., communication rate) of an attached computer or other device. The example tape 104 (like other types of storage media) has a bit density capability (e.g., amount of data bits that can fit on the tape per linear and/or square inch). Thus, the tape 104 may be moved at different speeds to read and/or write data in a manner that matches the data density of the tape 104 to the performance of the served processing platform. However, the operation of the controller 112 may be impacted by the tape speed.

The example tape 104 illustrated in FIG. 1 includes several tracks (illustrated by lines 114) that extend longitudinally along the tape 104. The example storage media head 102 reads and/or writes data to the tracks 114. The example tape head position controller 112 identifies a position of the storage media head 102 (e.g., which track 114 the storage media head 102 is reading and/or writing data to and/or from) by identifying markers 116 and 118 on the tape 104. The example first markers 116 run laterally across the tape and have substantially the same longitudinal position at each of the tracks 114. The example second markers 118, however, have different longitudinal positions at different tracks.

As the tape 104 moves past the storage tape head 102, the tape head position controller 112 determines the position of the storage tape head 102 based on the distance and/or time between identifying the first marker 116 and identifying the second marker 118. For example, if the speed of the tape 104 is known, the tape head position controller may identify the distance between the first marker 116 and the second marker 118 by multiplying the speed of the tape 104 by the time between detection of the first marker 116 and detection of the second marker 118. As described in more detail below, the measured position of the storage tape head 102 may be used to control changes in the position of the storage tape head 102.

Figure 2A:
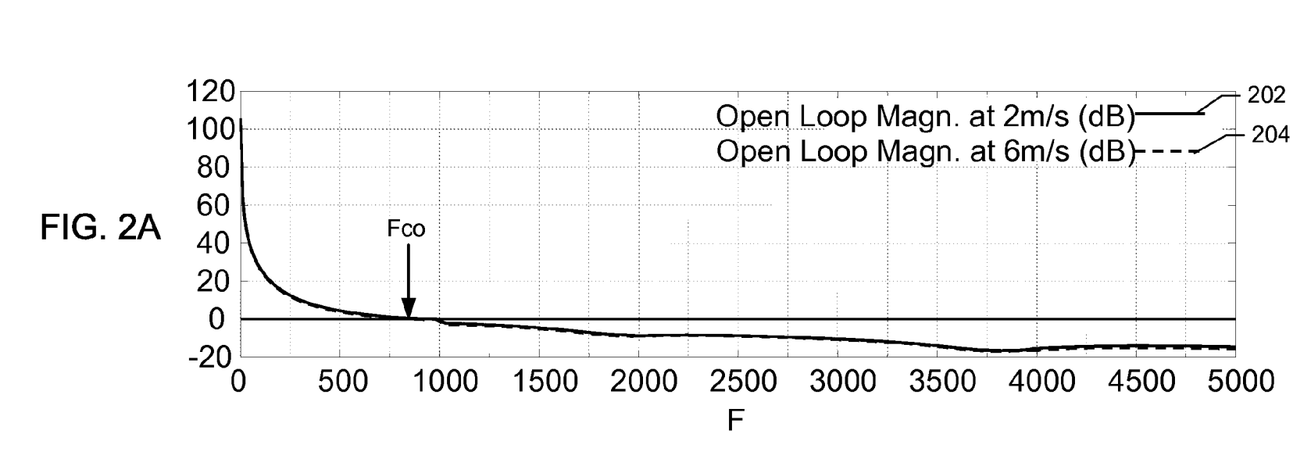
FIGS. 2A and 2B show open loop magnitudes and phases, respectively, of a known tape head position tracking controller at two different tape speeds.
Figure 2B:
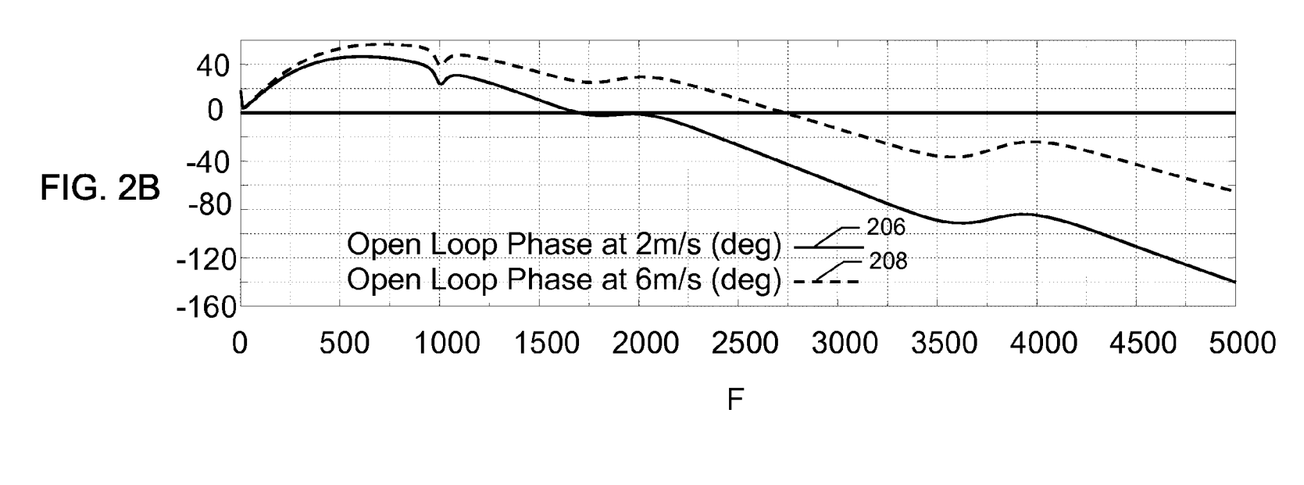

FIG. 2A shows simulated open loop magnitude responses 202 and 204 (in decibels), as a function of frequency (in Hz), of a known tape head position tracking controller at two different tape speeds (e.g., 2 m/s and 6 m/s). FIG. 2B shows simulated open loop phase responses 206 and 208 (in degrees), as a function of frequency (in Hz), of a known tape head position tracking controller at two different tape speeds (e.g., 2 m/s and 6 m/s). The open loop magnitude responses 202 and 204 and phase responses 206 and 208 of the control signal reflect the performance of a known storage media head. The magnitude responses 202 and 204 and/or the phase responses 206 and 208 may be determined by, for example, a filter in the storage media head that filters a position signal and/or a position error signal (PES). The different tape speeds are representative of speeds at which the tape is moved past the tape head, such as the storage media head of FIG. 1. For example, the tape speed of the magnitude response 202 and the phase margin 206 is about 2 meters/second (m/s), and the tape speed of the magnitude response 204 and the phase margin 208 is about 6 m/s. These tape speeds reflect example upper and lower limits on the speed of a known tape that may be used to accommodate the characteristics of different processing platforms.

As shown in the graph of FIG. 2A, the magnitudes 202 and 204 of the position control signals of the known tape storage device operating at different speeds have similar frequency responses. The magnitude of the position control responses 202 and 204 correspond to the gain(s) of the entire control loop of the known tape storage device. As used herein, the term "control loop" refers to a closed-loop system including an input signal, an output signal, and a feedback signal. In contrast, the term "open loop" refers to an open loop system or response including the input signal and the output signal, where the feedback signal does not affect the response. A crossover frequency (Fco), or the frequency at which the open loop gain is unity (0 dB), is a characteristic frequency associated with the open loop response of the filter. As shown in FIG. 2A, the gain of the filter does not substantially change when the speed of the tape 104 changes.

The phase margin of a control loop is the difference between the open loop phase and +/−180°. If the phase margin is 0 degrees at a frequency where the open loop magnitude is near unity (e.g., between about 0.1 dB and −0.1 dB), instability of the control loop may occur due to the repeated amplification and addition of feedback to the input. Because different factors may affect the phase margin of a system at any given moment, higher phase margins are desirable to avoid instability of the control loop.

As shown in FIG. 2B, the phase 206 of the position control signal at the lower tape speed (e.g., 2 meters/second (m/s)) is substantially closer to 0 than the phase 208 of the position control signal at the higher tape speed (e.g., 6 m/s). As a result, the control loop associated with the known storage media head has a smaller phase margin and is more susceptible to noise and instability at lower tape speeds.

Figure 3:
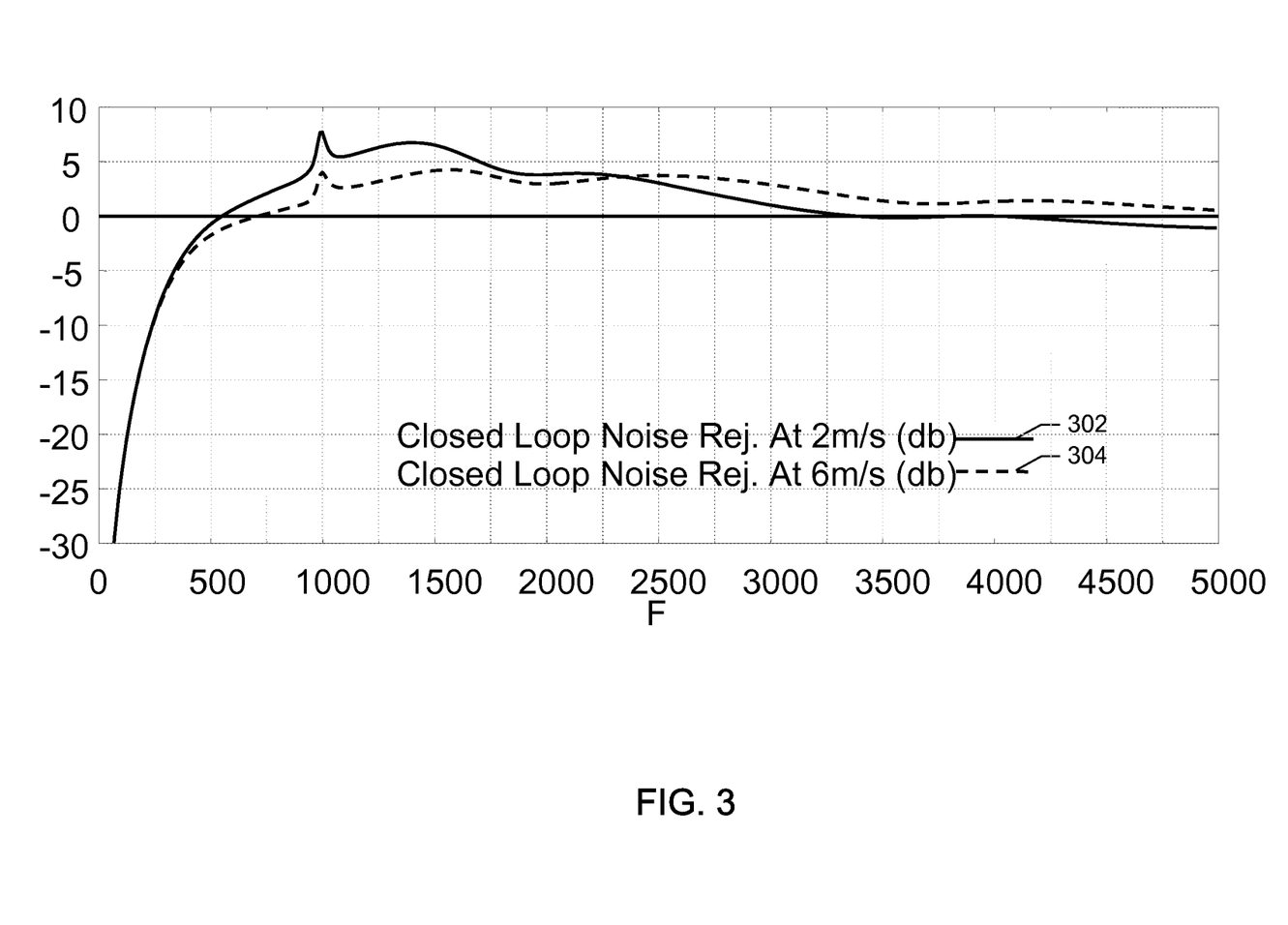
FIG. 3 shows closed loop noise amplification of a known tape head position tracking controller at two different tape speeds.

FIG. 3 shows simulated closed loop noise amplification 302 and 304 of a known tape head position tracking controller at the two different tape speeds (e.g., 2 m/s and 6 m/s). The noise amplification 302 and 304 is expressed in decibels (dB). Thus, frequencies having positive (e.g., greater than 0 dB) noise amplification 302 and 304 are amplified and frequencies having negative (e.g., less than 0 dB) noise amplification 302 and 304 are reduced. Thus, in the tape head position tracking controller 112 of FIG. 1 a lower amplification (e.g., a higher rejection) is desirable.

As shown in FIG. 3, the noise amplification 302 at the lower tape speed (e.g., 2 m/s) is higher than the noise amplification 304 at the higher tape speed (e.g., 6 m/s) between about 500 Hz and about 2250 Hz. This frequency range may be a range of interest because noise in the range of about 500-2250 Hz is more likely to affect the position of the storage tape head 102 in an undesirable manner.

Figure 4:
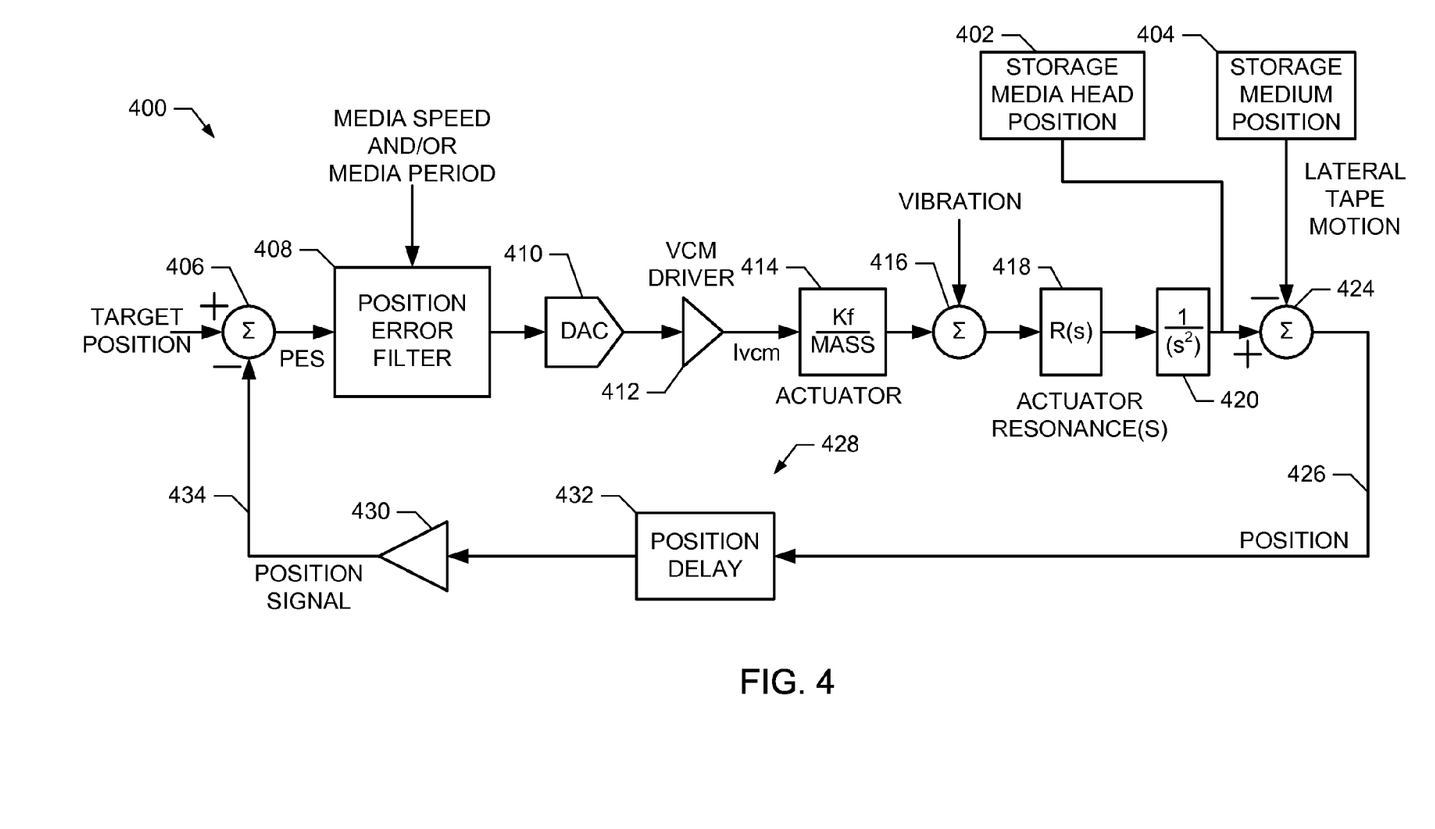
FIG. 4 is a block diagram of an example storage media head position controller including an example position error filter in accordance with the teachings described herein.

FIG. 4 is a block diagram of an example storage media head position controller 400 constructed in accordance with the teachings of this disclosure. The example storage media head position controller 400 illustrated in FIG. 4 is used to set a storage media head position 402 (e.g., a tape head position, an optical head position, a magnetic disk head position) in a desired location relative to a storage medium position 404 (e.g., a tape position, a magnetic medium position, and/or an optical medium position). To control the storage media head position 402, the example controller 400 of FIG. 4 receives a target position signal (e.g., from a data controller, from a processing platform, etc.) corresponding to a storage medium position 404, and outputs a signal to change the storage media head position 402 to the position corresponding to the target position. The s operator in FIG. 4 is representative of the Laplace operator.

The example storage media head position controller 400 receives a target position signal at a first summer 406. The target position signal may be generated by, for example, a memory controller or other control circuitry that tracks and/or controls read and/or write access to the storage medium. The first summer 406 combines (e.g., via subtraction) the target position signal with a measured position signal 434 (e.g., a detected current storage media head position 402) to generate a position error signal (PES). The first summer 406 of FIG. 4 combines the target position signal and the measured position signal by subtracting the measured position signal from the target position signal. Thus, the PES is representative of a difference between the target position and a currently measured storage media head position 434.

A position error filter 408 receives the PES and a speed signal (e.g., a signal representative of a speed of the storage medium (a media speed)) and generates a position control signal. The media speed may be a linear speed or a rotational speed, depending on the type of storage device/media being controlled. In some examples, the media speed is selected based on a processing capability of a computer in communication with a storage peripheral of which the example controller 400 is a part. The example position error filter 408 may, for example, remove noise from the PES to improve a quality of the PES and/or increase and/or maintain a sufficient phase margin, thereby increasing the accuracy of the storage media head position 402 relative to the target position and/or maintaining a stability of the controller 400 as the media speed changes. A more detailed description of the position error filter 408 is provided below with reference to FIGS. 5 and 6.

In the example of FIG. 4, the position error filter 408 is implemented using a digital signal processor. The position error filter 408 compensates or stabilizes the feedback loop and sets the loop rejection of the vibration and lateral tape motion inputs to the loop. To convert the position control signal(s) output by the position error filter 408 to an analog signal, the example controller 400 illustrated in FIG. 4 further includes a digital-to-analog converter 410 (DAC). The analog signal generated by the DAC 410 is input to a voice coil motor (VCM) driver 412. The VCM driver 412 illustrated in FIG. 4 generates a current (Ivcm) based on an input signal to drive an actuator 414. The actuator 414 of the illustrated example generates an acceleration on the storage media head based on the VCM driver current Ivcm. The acceleration of the storage media head is generated by the force from Ivcm and force constant Kf, which is applied to a moving mass. The moving mass is that of the storage media head (e.g., the storage media head 102 of FIG. 1) and/or moving parts of the actuator 414.

As with the storage media head position 402 and the storage medium position 404, the actuator 414 is affected by vibration. In the illustration of FIG. 4, the effects of the vibration are modeled using a second summer 416, although the second summer 416 is not physically present in the example controller 400. The force of the actuator 414 is further subject to actuator resonance(s) 418. Actuator resonances 418 are a modeled effect that is based on the actuation force (e.g., a transient frequency of the actuation force). One or both of the vibration and the actuator resonance(s) 418 may cause error in the storage media head position 402 relative to the target position.

Since the storage media head position 402 relative to the storage medium position 404 is used to determine mistracking in the control loop, the head acceleration (e.g., in m/s$^2$, gravitational acceleration (G's)) is converted to a storage media head position 402 (in m) via a double integration (420). The double integration 420 models the translation of the acceleration into the storage media head position 402 relative to a reference location. The storage media head position 402 is combined (e.g., via subtraction) with a lateral tape motion based on the storage medium position 404 at a summer 424 to generate a signal representative of a position feedback 426 of the storage media head. The example lateral tape motion is a difference between an expected lateral track location and the present lateral track location and may be caused by, for example, the storage medium wandering laterally with respect to the media storage head. Thus, the position feedback 426 is a position of the storage media head with respect to a reference that may be affected by the lateral movement in the storage medium position 404.

The position feedback 426 is fed to a feedback loop 428. To determine the storage media head position 402 relative to the storage medium position 404, the example storage medium may include position identifiers. For example, a storage tape 104 (FIG. 1) may have markers (e.g., the markers 116 and 118 of FIG. 1) that have different relative longitudinal positions on the storage tape 104 corresponding to the different lateral track positions. As the tape 104 moves past the tape head 102, the tape head 102 identifies the track(s) at which the tape head 102 is located based on the markers.

To identify the storage media head position 402, the example feedback loop 428 includes a position demodulator 430. The position demodulator 430 translates a position delay 432 (e.g., a time between detecting the first marker 116 and the second marker 118 of FIG. 1) into a measured position signal 434 representative of the storage media head position 402 (e.g., which of the tracks 114 of FIG. 1 the storage media head 102 is reading and/or writing data from and/or to). In some examples, the markers 116, 118 and the position demodulator 430 are implemented as described in U.S. Pat. No. 6,031,673, the entirety of which is hereby incorporated by reference. The measured position signal 434 is then fed back to the first summer 406 to combine with the target position signal to generate the PES as described above.

In some examples, the first summer 406, the position error filter 408, and the DAC 410 are implemented using a digital signal processor and/or another type of programmable logic device. In such examples, the digital signal processor receives a target position and the position signal, and outputs an analog signal to the VCM driver 412.

Figure 5:
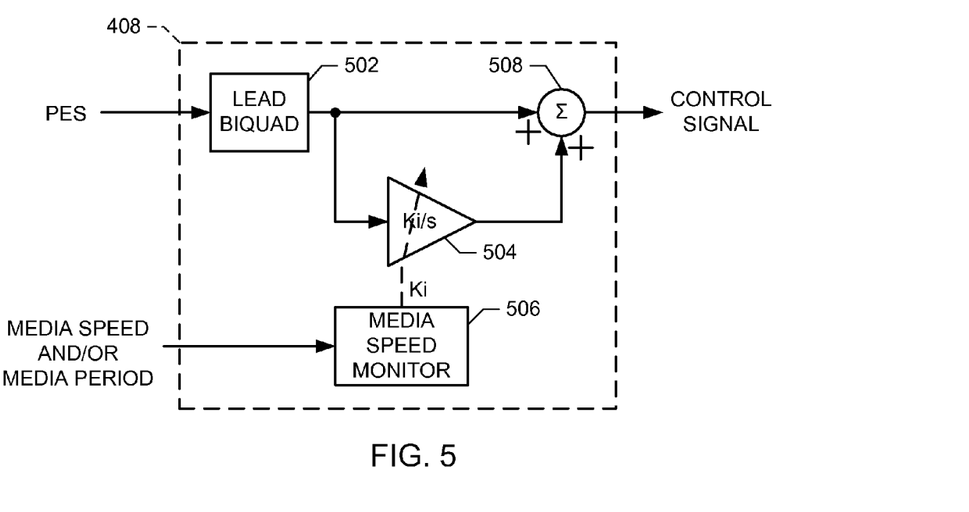
FIG. 5 is a more detailed block diagram of the example position error filter shown in FIG. 4 including a media speed monitor.

FIG. 5 is a more detailed block diagram of the example position error filter 408 shown in FIG. 4. The example position error filter 408 includes a lead biquad filter 502, an integrator 504, a media speed monitor 506, and a summer 508. As described above, the position error filter 408 receives the PES signal and a media speed and/or a media period and generates a filtered control signal for output to the DAC 410 (FIG. 4).

The lead biquad filter 502 performs biquadratic filtering on the PES signal, which is then output to the summer 508. However, other types of filters may additionally or alternatively be used to implement the filter 502. The integrator 504 integrates the signal output from the lead biquad filter 502 based on an integration factor Ki. As illustrated in FIG. 5, the example integrator 504 operates on the integration factor Ki in the s-domain (e.g., the Laplace transform) for computation.

To reduce the noise in the PES and/or to increase a phase margin of the control loop (FIG. 4), the media speed monitor 506 modifies the integration factor Ki based on the received media speed, thereby modifying the open loop and closed-loop frequency responses. In some examples, the media speed monitor 506 may modify the integration factor Ki continuously or substantially continuously as the media speed changes. In some other examples, the media speed monitor 506 may modify the integration factor Ki based on ranges of media speeds.

The integrator 504 and the demodulator 430 (FIG. 4) may each cause a phase loss (e.g., a phase delay between the input and the output) in the control loop of FIG. 4 and, thus, may impact the phase margin of the controller 400. The phase loss of the integrator 504 is based on the integration factor Ki, which determines a zero of the integrator 504, where zero refers to the root of a transfer function having the output signal of the lead biquad filter 502 as the input and the output signal of the summer 508 as the output signal. The example integration factor Ki may be converted to a zero of the integrator 504 IntZero by converting Ki (Hz) to radians per second (rad/s).

The phase loss by the demodulator 430 (FIG. 4) is affected by the position delay 432 and the media speed, and may be expressed by $\text{Phase}_{Dem}$ as shown in Equation 1, wherein Fco is the open loop crossover frequency in Hz, PosDelay is the spatial delay of the position detection locations on the storage medium (e.g., a longitudinal distance between markers 116 and 118 on the example magnetic tape 104 of FIG. 1) in meters, and MediaSpeed is in meters/second. In some examples, PosDelay is constant for a particular tape and may change if the tape is changed. However, in some other examples PosDelay may change based on other factors.

$$\text{Phase}_{Dem} = -\frac{360°}{\text{cycle}} \cdot Fco \cdot PosDelay / MediaSpeed \quad \text{Eq. 1}$$

Equation 2 represents a phase loss $\text{Phase}_{Int}$ due to the example integrator 504 of FIG. 5. IntZero is the zero of the integrator 504. Equations 1 and 2 together represent components of the phase margin of the example controller 400 of FIG. 4.

$$\text{Phase}_{Int} = -\tan^{-1}(IntZero / Fco) \approx -\frac{IntZero \cdot 180}{Fco \cdot \pi} \quad \text{Eq. 2}$$

An example relationship between the integrator zero (IntZero) and the media speed is shown in equations 3 and 4 below. In equation 3, IntZeroMax is the integrator zero in Hz at the upper media speed (e.g., a 6 m/s tape speed), and MediaSpeed Max is the upper media speed (e.g., tape speed).

IntZero=IntZeroMax+$K$1/MediaSpeed Max−$K$1/MediaSpeed Eq. 3

While the upper media speed is used as the baseline media speed to determine a baseline integrator zero, other media speeds may be used as the baseline. Additionally, while the illustrated example uses a tape speed in meters per second, other media speeds may be substituted to conform to the relevant media (e.g., angular velocity in a hard disk or optical drive). The term K1 in the example equation 4 may be a predetermined constant or variable based on constants and/or variables Fco, PosDelay, and/or CorrRatio. In equation 4, CorrRatio is a correction factor that determines an amount of a loss in phase margin from a previous tape speed to a current tape speed that is corrected.

$K1=2\pi \cdot Fco^2 \cdot PosDelay \cdot CorrRatio$ Eq. 4

If the example CorrRatio is equal to 1, the full phase reduction is corrected. If the example CorrRatio is less than 1, only a portion of the phase difference is corrected. If the example CorrRatio is greater than 1, the phase reduction is overcorrected. As the phase margin is increased (e.g., by increasing CorrRatio, thereby decreasing the integration factor Ki as the media speed decreases), the rejection of noise in the control loop decreases. Therefore, a CorrRatio less than 1 may be desirable in some applications to increase noise rejection. In contrast, a CorrRatio greater than 1 may be desirable to increase phase margin and, thus, stability. While in some examples CorrRatio is a constant correction factor, CorrRatio may alternatively be a variable based on, for example, MediaSpeed. In some examples, both phase margin and noise rejection are improved compared to a controller that has a constant Ki. As shown in the example equations 3 and 4, the integrator zero IntZero decreases as MediaSpeed decreases, thereby reducing the phase margin, relative to the phase margin with a constant integrator zero IntZero, when MediaSpeed decreases.

The example media speed monitor 506 receives the media speed (e.g., a tape speed) and determines an integration factor Ki based on equations 3 and 4 (e.g., via equations 5-7 described below). The media speed, or a signal representative of the media speed, may be received from a speed controller that controls the media speed based on, for example, the performance of a device (e.g., a computer) connected to the controller 400 (FIG. 4). A more detailed description of an example media speed monitor 506 is provided below with reference to FIG. 6.

When the media speed monitor 506 receives a media speed, the media speed monitor determines the integration factor Ki and updates the integrator 504 with the same. Thus, when the integrator 504 receives an output signal from the lead biquad filter 502, the integrator 504 performs the corresponding integration based on the updated integration factor Ki. The output signal from the integrator 504 is combined with the filtered signal from the biquad filter 502 at the summer 508. Accordingly, the output of the example summer 508 and, thus, the position error filter 408, has a transfer function of approximately 1+Ki/s. In some examples, the position error filter 408 may include additional filters (e.g., "notch" biquad filters) to reduce the effects of the resonances described above. Due to the updated integration factor Ki, the output from the summer 508 (e.g., the filtered PES) has an increased phase margin and, thus, improved stability.

In some examples, the media speed monitor 506 updates the integration factor Ki at the integrator 504 when the media speed monitor 506 receives and/or detects a change in the media speed. In some examples, the media speed changes over a substantially continuous range and, thus, the media speed monitor 506 may additionally or alternatively designate one or more ranges of media speeds for which the integration factor Ki remains the same.

The media speed monitor 506 may further determine (e.g., calculate), update, and/or receive variables and/or constants that may be used to increase the processing performance of the media speed monitor 506 during operation of the controller 400. For example, the media speed monitor 506 may receive Fco, CorrRatio, and PosDelay used in equations 3 and/or 4 as constants. In some examples, the open loop crossover frequency Fco is a constant while the gain of the biquad filter 502 is constant. In some examples, the position delay PosDelay is a constant while the storage media 104 (FIG. 1) is constant. The correction ratio CorrRatio may be constant or variable based on a desired operation of the integrator 504 over different frequencies. For example, a programmer may change CorrRatio based on a frequency of the control loop to obtain a higher phase margin at certain frequencies and to obtain more noise rejection at other frequencies. However, such a control scheme may require more processing cycles to implement than setting CorrRatio as a constant.

By determining and/or receiving Fco, CorrRatio, and PosDelay as constants at some time prior to operation, the example media speed monitor 506 may determine a baseline integration factor $K_{base}$ and an integration factor change rate $K_{chg}$ as constants using equations 5 and 6 below. In some examples, the baseline integration factor $K_{base}$ and/or the integration factor change rate $K_{chg}$ are determined prior to operation of the controller 400.

$$K_{base}=2\pi \cdot (\text{IntZeroMax}+K1/\text{MediaSpeedMax}) \quad \text{Eq. 5}$$

$$K_{chg}=2\pi \cdot K1 \quad \text{Eq. 6}$$

The example baseline integration factor $K_{base}$ is the integration factor Ki at a predetermined baseline MediaSpeed (e.g., MediaSpeedMax, an upper media speed limit). The example integration factor change rate Kchg is a change rate of the integration factor Ki as MediaSpeed changes. After determining $K_{base}$ and $K_{chg}$, the example media speed monitor 506 may then use equation 7 below to rapidly determine an updated integration constant Ki when the MediaSpeed is received.

$$Ki=K_{base}-K_{chg}/\text{MediaSpeed} \quad \text{Eq. 7}$$

The media speed monitor 506 may use equation 8 as an alternative to equation 7 to increase the determination speed of the updated integration constant Ki. Because division operations are generally more computationally expensive in digital signal processing, equation 8 converts the MediaSpeed to a MediaPeriod in seconds/meter (e.g., MediaPeriod=1/MediaSpeed). As a result, the media speed monitor 506 may use an add-multiply operation, which is generally a computationally inexpensive operation in digital signal processing, to implement equation 8.

$$Ki=K_{base}-K_{chg} \cdot \text{MediaPeriod} \quad \text{Eq. 8}$$

Figure 6:
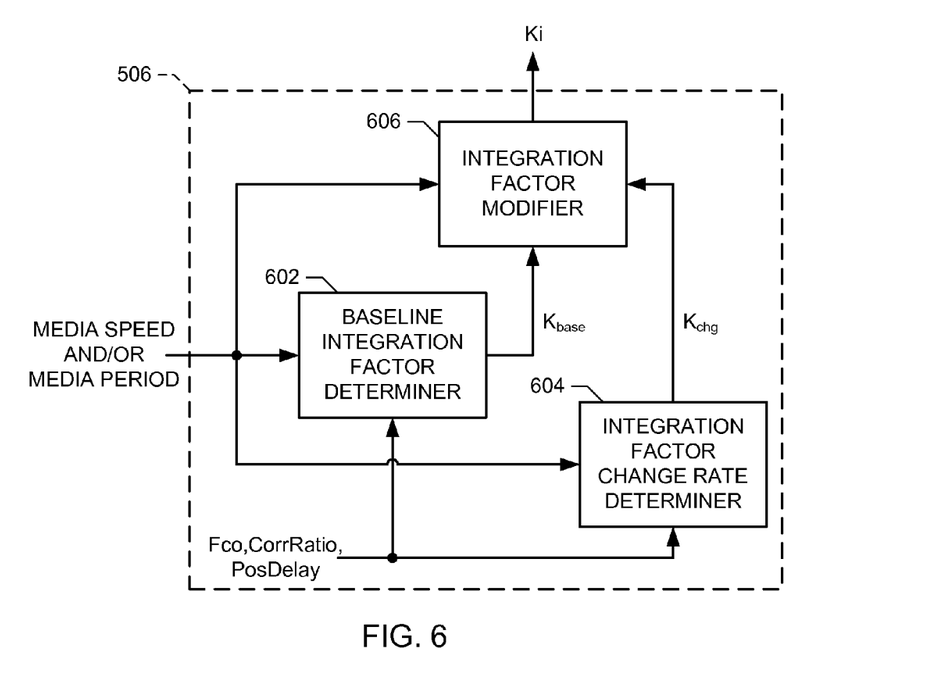
FIG. 6 is a more detailed block diagram of the example media speed monitor shown in FIG. 5.

FIG. 6 is a more detailed block diagram of the example media speed monitor 506 shown in FIG. 5. The example media speed monitor 506 of FIG. 6 includes a baseline integration factor determiner 602, an integration factor change rate determiner 604, and an integration factor modifier 606. As described above, the media speed monitor 506 receives a MediaSpeed and/or a MediaPeriod and determines an integration factor Ki. The baseline integration factor determiner 602 determines a baseline integration factor (e.g., $K_{base}$) using, for example, equations 4 and 6 above. Similarly, the example integration factor change rate determiner 604 of FIG. 6 determines an integration factor change rate (e.g., $K_{chg}$) using the example equations 4 and 5. The integration factor change rate determiner 604 may determine the baseline integration factor $K_{base}$ and/or the integration factor change rate $K_{chg}$ prior to operation of the example controller 400.

The baseline integration factor determiner 602 and the integration factor change rate 604 provide the baseline integration factor $K_{base}$ and the integration factor change rate $K_{chg}$, respectively, to the integration factor modifier 606. During operation of the storage media head position controller 400, the integration factor modifier 606 receives the MediaSpeed and/or the MediaPeriod and determines an integration factor Ki. As described above, the media speed monitor 506 updates the integrator 504 (FIG. 5) with the integration factor Ki. By updating the integration factor Ki based on the MediaSpeed, the example media speed monitor 506 provides independent adjustment of noise rejection for different media speeds.

In some examples, the baseline integration factor determiner 602 and/or the integration factor change rate determiner 604 may be omitted and/or replaced with a storage device that receives the baseline integration factor $K_{base}$ and the integration factor change rate $K_{chg}$ from a source external to the media speed monitor 506. For example, the baseline integration factor $K_{base}$ and the integration factor change rate $K_{chg}$ may be predetermined and provided to the integration factor modifier 606 as constants for use during operation of the media speed monitor 506. In these examples, the media speed monitor 506 only receives the MediaSpeed and/or the MediaPeriod and implements the corresponding example equation 7 or 8 accordingly, thereby reducing computational load on a processing device and/or reducing processing time prior to operation of the media speed monitor 506.

Figure 7A:
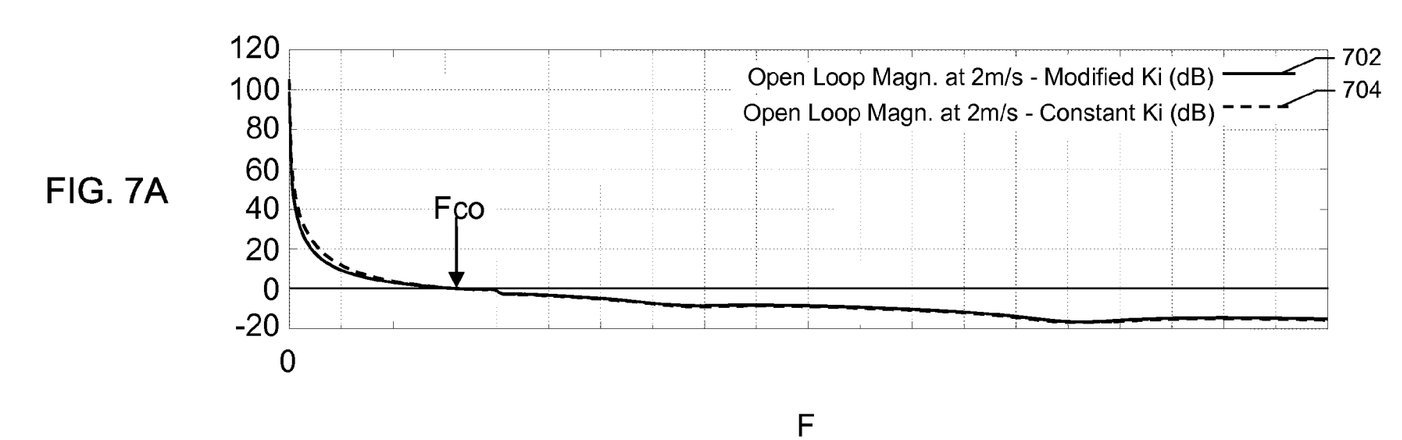
FIG. 7A illustrates example open loop magnitudes of the example storage head media position controller of FIG. 4 and a known tape head position tracking controller having a constant integration factor.
Figure 7B:
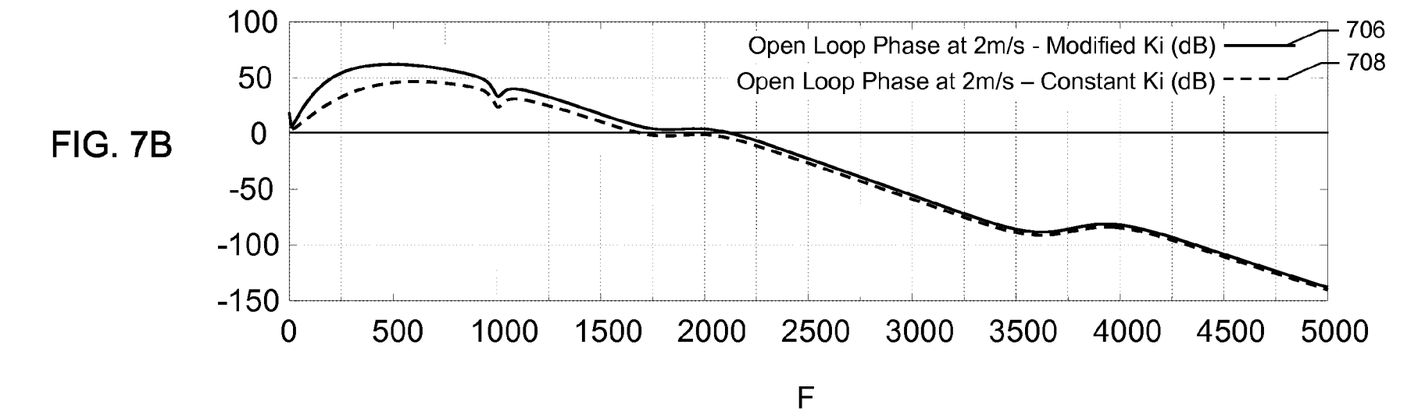
FIG. 7B illustrates example open loop phases of the example storage head media position controller of FIG. 4 and a known tape head position tracking controller having a constant integration factor.

FIG. 7A shows simulated open loop magnitudes 702 and 704 of the example storage head media position controller 400 of FIG. 4 (702) and a known tape head position tracking controller (704) having a constant integration factor, respectively. The open loop magnitudes 702 and 704 are similar within the illustrated frequencies. FIG. 7B shows simulated open loop phases 706 and 708 of the example storage head media position controller 400 (706) and the known tape head position tracking controller (708) having a constant integration factor, respectively. The open loop magnitudes 702 and 704 and the open loop phases 706 and 708 are simulated at an example speed equal to a lower media (e.g., tape) speed limit of 2 m/s, where an upper tape speed limit is 6 m/s. The example simulations were run using a CorrRatio of 333/282, or about 1.18.

As shown in FIG. 7B, the phase 706 of the example controller 400 has a larger phase margin than the phase 708 of the known tape head position tracking controller. The larger phase margin of the controller 400 provides improved loop stability of the controller 400 and improved noise performance (e.g., reduced noise amplification and/or increased noise rejection) within the illustrated frequencies. In particular, the example controller 400 has a substantially improved phase margin within the 0-2000 Hz range.

Figure 8:
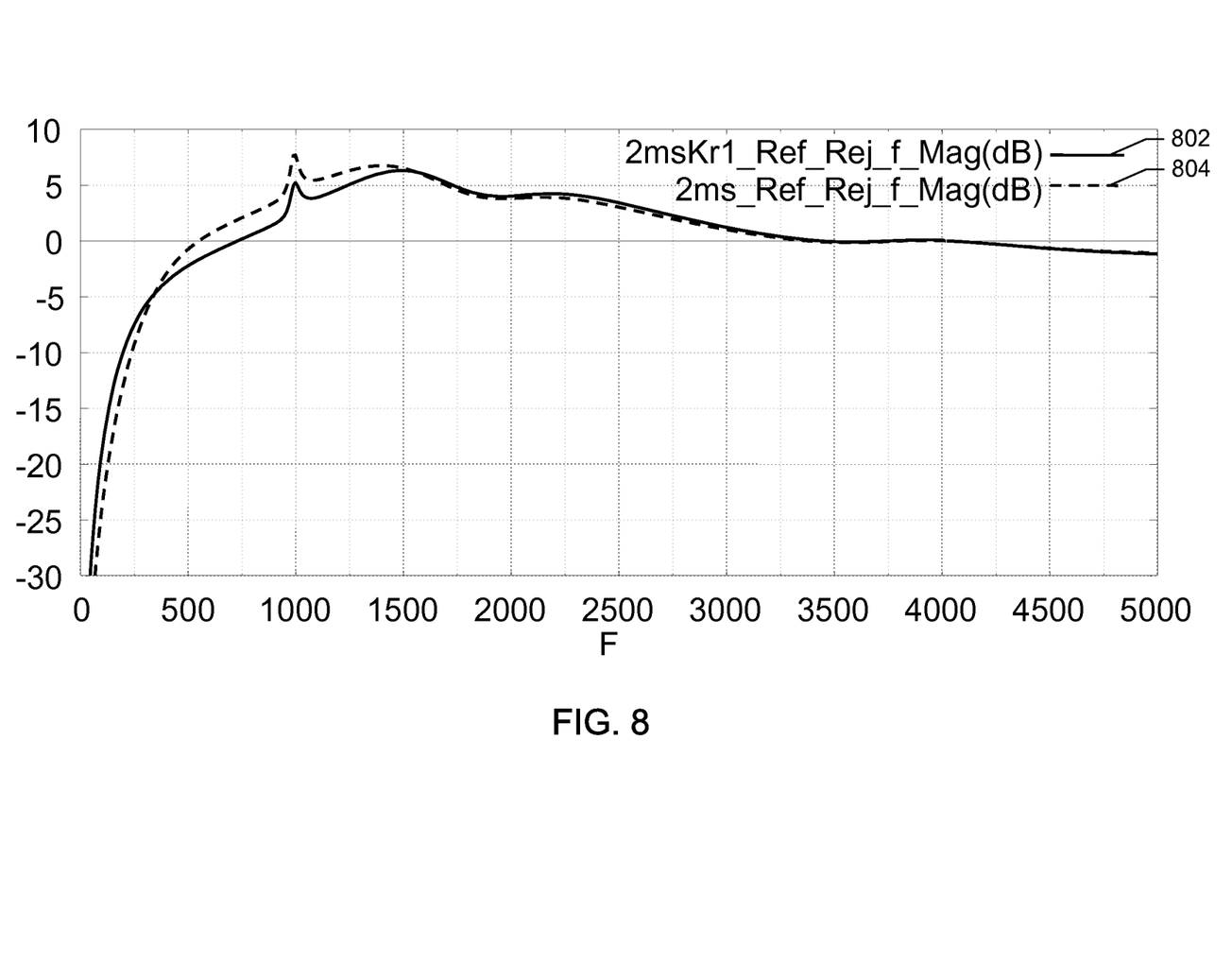
FIG. 8 illustrates example closed loop noise amplification of the example storage head media position controller of FIG. 4 and a known tape head position tracking controller having a constant integration factor.

FIG. 8 shows simulated closed loop noise amplification 802 and 804 of the example storage head media position controller 400 of FIG. 4 (802) and a known tape head position tracking controller (804) having a constant integration factor, respectively. As shown in FIG. 8, the noise amplification 802 of the example controller 400 of FIG. 4 is lower than the noise amplification 804 of the known tape head position tracking controller.

Figure 9:
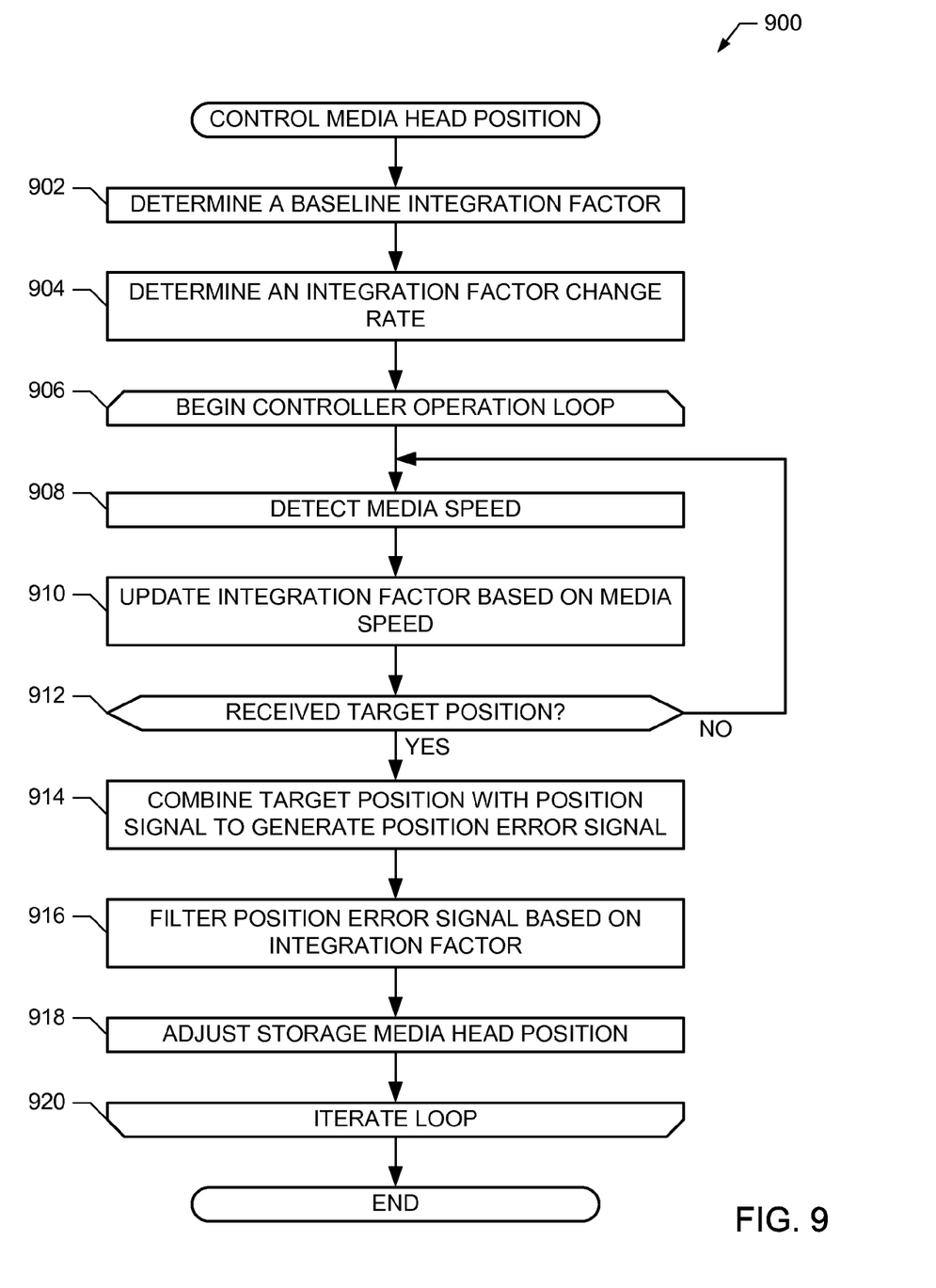
FIG. 9 is a flowchart illustrating example machine readable instructions which may be executed to implement the example storage head media position controller of FIG. 4 to control a storage media head.

A flowchart representative of example machine readable instructions 900 for implementing the storage head media position controller 400 of FIG. 4 is shown in FIG. 9. In this example, the machine readable instructions 900 comprise a program for execution by a processor such as a digital signal processor. The program may be embodied in software stored on a computer readable medium such as a CD-ROM, a floppy disk, a hard drive, a digital versatile disk (DVD), or a memory associated with a digital signal processor, but the entire program and/or parts thereof could alternatively be executed by a device other than a digital signal processor and/or embodied in firmware or dedicated hardware. Further, although the example program is described with reference to the flowchart illustrated in FIG. 9, many other methods of implementing the example storage head media position controller 400 may alternatively be used. For example, the order of execution of the blocks may be changed, and/or some of the blocks described may be changed, eliminated, or combined.

As mentioned above, the example process of FIG. 9 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIG. 9 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

The program 900 of FIG. 9 begins by determining (e.g., via the position error filter 408 of FIG. 4, via the baseline integration factor determiner 602 of FIG. 6) a baseline integration factor (e.g., $K_{base}$) (block 902). The position error filter 408 (e.g., via the integration factor change rate determiner 604 of FIG. 6) determines an integration factor change rate (block 904). The example storage media head position controller 400 may then begin a controller operational loop at block 906 to iterate blocks 908-920.

At block 908, the position error filter 408 (e.g., at the media speed monitor 506 of FIG. 5) detects (or receives) a media speed. For example, the media speed monitor 506 may receive a tape speed in m/s. In some other examples, the media speed monitor 506 may receive a tape period in seconds/meter at block 908. Based on the media speed, the media speed monitor 506 updates the integration factor Ki in the integrator 504 of FIG. 5 (block 910). If the storage head media position controller 400 has not received a target position (block 912), control returns to block 908 to detect the media speed. However, if the storage head media position controller 400 has received a target position (block 912), the summer 406 combines the target position with a position signal (e.g., the position signal 434 from the demodulator 430 of FIG. 4) to generate a PES (block 914). The position error filter 408 receives and filters the PES based on the integration factor Ki (block 916). Based on the filtered PES, the storage media head position controller 400 (e.g., via the actuator 414) adjusts a storage media head position 402 relative to a storage medium position 404 (block 918). The example loop 906-920 may iterate at block 920 to update the integration factor Ki and/or to adjust a storage media head position 402.

From the foregoing, it will be appreciated that the above disclosed methods, apparatus and articles of manufacture may be used to control a storage media head position controller that have changing storage media speeds. The example methods, apparatus, and articles of manufacture control the storage media heads with increased accuracy and reduced noise at different storage medium speeds.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A storage media head position controller, comprising:
   a position error filter to filter a media head position error based on a target position for a storage media head relative to a storage medium and a present media head position to generate a position signal, the position error filter comprising an integrator to modify a) a noise rejection and b) a phase of a filtered position error based on an integration factor; and
   a media speed monitor to modify the integration factor of the position error filter based on a media speed to adjust a phase margin of the position signal.

2. A storage media head position controller as defined in claim 1, wherein the media speed monitor is to decrease the integration factor as the media speed decreases.

3. A storage media head position controller as defined in claim 1, wherein the media speed monitor modifies the integration factor to increase the phase margin of the position signal relative to a previous integration factor.

4. A storage media head position controller as defined in claim 1, wherein the position error filter comprises a digital signal processor.

5. A storage media head position controller as defined in claim 1, further comprising a position demodulator to detect a media head position error signal and to determine the present media head position based on the media head position error signal.

6. A storage media head position controller as defined in claim 1, wherein the media speed monitor is to reduce the integration factor in response to a decrease in the media speed.

7. A storage media head position controller as defined in claim 1, wherein the integration factor is a root of a transfer function of the integrator.

8. A storage media head position controller, comprising:
   a position error filter to filter a media head position error based on a target position for a storage media head relative to a storage medium and a present media head position to generate a position signal, wherein the position error filter comprises a filter to filter the position error, an integrator to modify a gain and a phase of a filtered position error based on an integration factor, and a summer to combine the filtered position error and an integrator output; and
   a media speed monitor to modify the integration factor in the position error filter based on a media speed to adjust a phase margin of the position signal.

9. A storage media head position controller comprising:
   a position error filter to filter a media head position error based on a target position for a storage media head relative to a storage medium and a present media head position to generate a position signal;
   a media speed monitor to modify an integration factor in the position error filter based on a media speed to adjust a phase margin of the position signal, the media speed monitor comprising:
      a baseline integration factor determiner to determine a first integration factor corresponding to a first media speed;
      an integration factor change rate determiner to determine an integration factor change rate based on a phase change caused by a change in media speed between the first media speed and a second media speed; and
      an integration factor modifier to modify the integration factor to a second integration factor based on the change in media speed, the first integration factor, and the integration factor change rate.

10. A storage media head position controller as defined in claim 9, wherein the integration factor change rate is further based on at least one of a correction factor, an open loop crossover frequency of a position error detector, and a media position error detection distance.

11. A storage media head position controller as defined in claim 9, wherein modifying the integration factor to a second integration factor comprises multiplying or dividing the integration factor change rate with the media speed and adding or subtracting the first integration factor.

12. A method to control a storage media head position, comprising:
   detecting a media speed of a storage medium and a position error of a storage media head;
   modifying an integration factor based on the media speed;
   filtering the position error based on an integration using the modified integration factor to determine a storage media head position change; and
   changing a position of the storage media head based on the storage media head position change.

13. A method as defined in claim 12, wherein modifying the integration factor is based on a correction factor.

14. A method as defined in claim 13, wherein modifying the integration factor further comprises determining an integration factor change rate based on an open loop crossover frequency and the correction factor.

15. A method as defined in claim 14, wherein modifying the integration factor further comprises determining an integration factor based on a second media speed and the integration factor change rate.

16. A method as defined in claim 12, wherein modifying the integration factor further comprises increasing the integration factor in response to detecting an increased media speed.

17. A method as defined in claim 12, wherein the integration factor is a root of a transfer function of an integrator that performs the integration.

18. A first tangible computer readable medium comprising machine readable instructions which, when executed, cause a machine to at least:
   detect a media speed of a second storage medium and a position error of a storage media head;
   modify an integration factor based on the media speed of the second storage medium;
   filter the position error based on an integration using the modified integration factor to generate a storage media head position change signal; and
   change a position of the storage media head based on the storage media head position change signal.

19. A first tangible computer readable medium as defined in claim 18, wherein the instructions are to cause the machine to modify the integration factor based on a correction factor.

20. A first tangible computer readable medium as defined in claim 18, wherein the instructions are to cause the machine to modify the integration factor by increasing the integration factor in response to detecting an increased media speed.

21. A first tangible computer readable medium as defined in claim 18, wherein the integration factor is a root of a transfer function of an integrator that performs the integration.

22. A first tangible computer readable medium comprising machine readable instructions which, when executed, cause the machine to at least:
   detect a media speed of a second storage medium and a position error of a storage media head;
   modify an integration factor based on the media speed by determining an integration factor change rate based on an open loop crossover frequency and the correction factor;
   filter the position error based on an integration using the modified integration factor to generate a storage media head position change signal; and
   change a position of the storage media head based on the storage media head position change signal.

23. A first tangible computer readable medium as defined in claim 22, wherein the instructions are to cause the machine to modify the integration factor by determining an integration factor based on a second media speed and the integration factor change rate.

* * * * *

UNITED STATES PATENT AND TRADEMARK OFFICE
CERTIFICATE OF CORRECTION

| | | |
|---|---|---|
| PATENT NO. | : 8,665,552 B2 | Page 1 of 1 |
| APPLICATION NO. | : 12/834674 | |
| DATED | : March 4, 2014 | |
| INVENTOR(S) | : Donald J. Fasen | |

It is certified that error appears in the above-identified patent and that said Letters Patent is hereby corrected as shown below:

In the Claims

In column 12, line 49, in Claim 9, delete "controller" and insert -- controller, --, therefor.

Signed and Sealed this
Twenty-fourth Day of June, 2014

Michelle K. Lee
*Deputy Director of the United States Patent and Trademark Office*